United States Patent
Heacock et al.

[11] Patent Number: 6,101,028
[45] Date of Patent: Aug. 8, 2000

[54] MINIATURE MICROSCOPE

[75] Inventors: Gregory L. Heacock, Camas; Wayde Watters, Kent; Joel Robinson, Seattle, all of Wash.

[73] Assignee: Virtual Vision, Inc., Redmond, Wash.

[21] Appl. No.: 09/370,547

[22] Filed: Aug. 9, 1999

Related U.S. Application Data

[63] Continuation-in-part of application No. 09/219,065, Dec. 22, 1998, Pat. No. 6,005,720.
[51] Int. Cl.⁷ .......................... G02B 21/00; G02B 27/14; G02B 9/06; G02B 21/20
[52] U.S. Cl. .......................... 359/368; 359/630; 359/362; 359/375; 359/633
[58] Field of Search .................................. 359/630, 367, 359/368, 375, 376, 379, 662, 633

[56] References Cited

U.S. PATENT DOCUMENTS 5,777,783   7/1998   Endou ...................... 359/385

*Primary Examiner*—Gregory Epps
*Assistant Examiner*—Michael A. Lucas
*Attorney, Agent, or Firm*—McAndrews, Held & Malloy, Ltd.

[57] ABSTRACT

A miniature microscope is extremely small, fitting in a palm of a user's hand while providing powerful magnification and enhanced brightness so that the details of an object which cannot be resolved by an unaided eye can be easily seen. The microscope includes a housing have a holder for supporting an object to be viewed. At least one light source is position in the housing off-axis with respect to the object to be viewed. A first prism includes a first prism surface for reflecting light from the light source to a beam splitter surface wherein the beam splitter surface reflects light from the first prism surface to the object to be viewed. The beam splitter surface also passes light reflected from the object therethrough to a second prism. The second prism is positioned with respect to the first prism to provide refraction correction. The miniature microscope also includes a movable focusing optic that receives light passed through the first and second prisms for providing a magnified image of the object supported in the holder.

20 Claims, 3 Drawing Sheets

MINIATURE MICROSCOPE

CROSS-REFERENCE TO RELATED APPLICATIONS

This is a continuation-in-part of U.S. patent application Ser. No. 09/219,065 filed Dec. 22, 1998 now U.S. Pat. No. 6,005,720. This application is also related to U.S. patent application Ser. No. 09/370429 filed concurrently herewith and entitled Head Mounted Display System With Flexible Display Module.

STATEMENT REGARDING FEDERALLY SPONSORED RESEARCH OR DEVELOPMENT

N/A

FIELD OF THE INVENTION

The present invention relates to a miniature microscope and more particularly to a miniature device for magnifying an object.

BACKGROUND OF THE INVENTION

Microscopes are used to magnify an object or material so that aspects of the object that are so miniscule that they cannot be resolved by an unaided eye, can be seen. Microscopes are essential not only to biological studies but they are also used extensively in the field of microelectronic manufacturing. Known microscopes are typically table top instruments that are large, bulky and not easily portable. As such, they are typically used only in laboratories or the like and not in the field or in a manufacturing or design area of an industrial plant. However, there is often a need to view an object under a microscope outside of a laboratory.

BRIEF SUMMARY OF THE INVENTION

In accordance with the present invention, the disadvantages of prior microscopes have been overcome. The miniature microscope of the present invention employs a minimal number of optics to provide a magnified image with enhances brightness but in an extremely compact arrangement so that the microscope can fit, for example, in the palm of a hand.

More particularly, the miniature microscope of the present invention includes a housing having a holder for supporting an object to be viewed. At least one light source is positioned in the housing off-axis with respect to the object to be viewed when supported in the holder. The optical system includes a first prism having a first surface for reflecting light from the light source to a beam splitter surface. The bean splitter surface reflects light from the first prism surface to the object to be viewed and the beam splitter passes therethrough light reflected from the object. A second prism is positioned with respect to the first prism to provide refraction correction. A movable focusing optic receives light passed through the first and second prisms for providing a magnified image of the object supported in the holder.

In one embodiment of the present invention, the prism uses total internal reflection for reflecting light from the first prism surface to the beam splitter surface and for reflecting light from the beam splitter surface to the object to be viewed. Because total internal reflection is used to form the beam splitter surface, little light is lost at the surface and the brightness of the image is greatly enhanced.

In another embodiment of the present invention, the illumination system includes a polarizer for polarizing the light from the light source that is directed to the first prism surface. The prism may use total internal reflection for reflecting light from the first prism surface to the beam splitter surface and/or for reflecting light from the beam splitter surface to the reflective display.

In a further embodiment of the present invention, the beam splitter surface is formed of a second polarizer that reflects light of a first polarization received from the first prism's surface and that passes therethrough light of a second polarization. A further polarizer, which may take the form of a quarter-wave plate, is disposed between the first prism and the object to be viewed. The quarter-wave plate changes the polarization of the light so that the light reflected from the object is polarized 90° from the original polarization.

In another embodiment of the present invention, instead of a holder for supporting an object to be viewed, the housing includes an aperture through which an object may be viewed. In this embodiment, the focusing optic need not be movable but may be fixed relative to the aperture through which the image is viewed.

These and other advantages and novel features of the present invention, as well as details of an illustrated embodiment thereof, will be more fully understood from the following description and drawings.

DETAILED DESCRIPTION OF THE INVENTION

Figure 1:
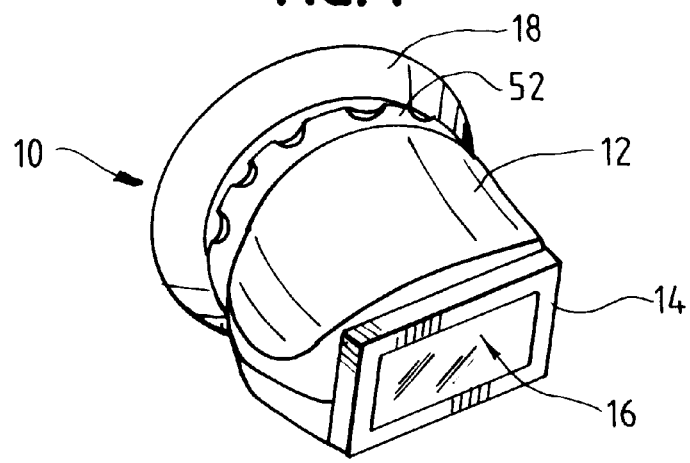
FIG. 1 is a perspective view of one embodiment of the miniature microscope of the present invention.

The miniature microscope 10 of the present invention includes a housing 12 having a holder 14 for supporting an object 16 to be magnified and viewed by a user through an eyepiece 18. The object 16 may be material placed on a slide 19. The holder 14 for a slide 19 includes a slot 15 through which a slide 19 is inserted. The holder 14 also includes a slotted track 17 into which the slide 19 is moved to maintain the slide 19 in position in the holder 14. However, the holder 14 may be such as to support other objects not supported on a slide but to be viewed by the microscope such as microelectronics, a micro-display or other objects, the details of which cannot be resolved by an unaided eye.

The miniature microscope includes a compact arrangement of optics that provides powerful magnification. For example, if the object is a micro-display having a height and width on the order of 12 mm×12 mm but having a sufficiently large number of pixels so as to be capable of displaying as much information as a standard NTSC computer display, the image generated by the display cannot be resolved by an eye without magnification. However, with the optical arrangement of the present invention, the image is magnified with minimal distortion such that the image on the micro-display can be clearly seen. The overall dimensions of the miniature microscope are so small that it can fit in the palm of a hand. For example, the miniature microscope can be on the order of 4 cm in height, width and/or length. However, it should be appreciated that the microscope can have larger dimensions and still be miniature compared to a standard tabletop microscope.

Figure 2:
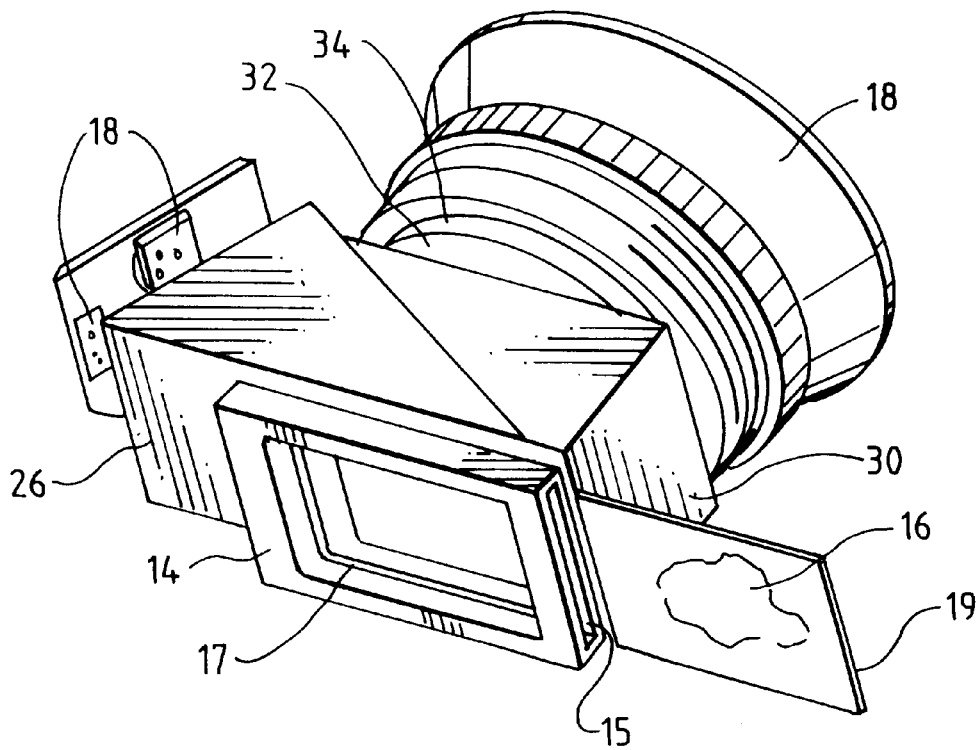
FIG. 2 is a perspective view of the optical components of one embodiment of the miniature microscope.
Figure 3:
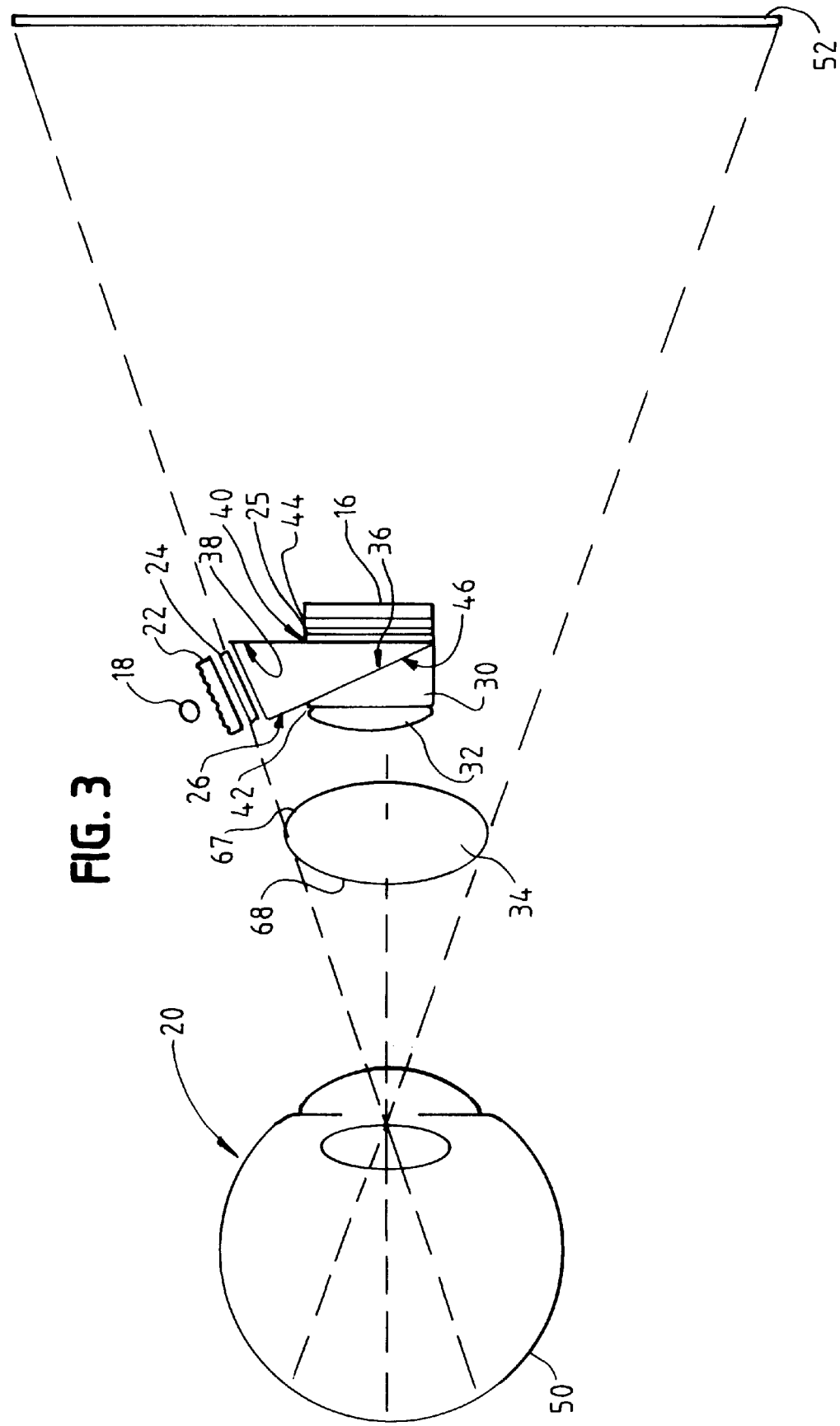
FIG. 3 is a side view of the optical components of a second embodiment of the present invention illustrating the image path from the object to be viewed to a user's eye.

The optics of the miniature microscope 10 are illustrated in FIGS. 2 and 3. The optics include a light source 18 that is positioned off-axis with respect to the object 16 to be viewed, i.e., not in front (or in back) of the object, so as not to block any portion of the optical path from the object 16 to the user's eye 20. The light source may be a single LED or multiple LED's for increased illumination light. The light source may be white light, infrared light, or colored light of a particular wavelength suitable for viewing a particular object or specimen.

Light from the light source 18 is directed to the object 16 by an illumination system that includes a lens 22 and a first prism 26. Light reflected by the object 16 to be viewed passes through an imaging system that in one embodiment includes a refraction corrector in the form of a second prism 30, a field lens 32 and a focusing lens 34.

As shown in detail in FIG. 3, light from the source 18 passes through the illumination lens 22. The illumination lens 22 may be a Fresnell lens or the like for collimating light and directing it to the first prism 26. The illumination light entering the prism 26 is reflected from a first prism surface 38 to a beam splitting surface 36 of the prism 26. The beam splitting surface 36 reflects the light to the object 16 to be viewed. The light reflected to the object by the beam splitter is substantially on-axis i.e., parallel to an axis that is perpendicular to the plane of the slide 19. The light reflected from the object 16 passes through the beam splitter surface 36 to the prism 30. The prism 30 corrects the image generated by the display 12 for refraction. A field lens 32 that may be formed as an integral part of the optic 30 or as a separate lens, directs the image rays towards the focusing lens 34. When the rays exit the lens 34, they are generally parallel until the rays intersect the corneal surface of the user's eye 16. The cornea focuses the rays onto the retina 50. To the user, the rays appear to originate from a virtual image 52 that is substantially magnified by the lens 34 so that the user can clearly resolve the details of the object 16 that can not be seen by an unaided eye.

In a preferred embodiment, the angles of the prism 26 are selected so that the light is reflected by the prism surface 38 to the beam splitter surface 36 by total internal reflection and/or the light is reflected by the beam splitter surface 36 to the object 16 by total internal reflection. An air gap 40 is maintained between the object 16 and the surface 38 for maximum light throughput via total internal reflection off of the surface 38. Similarly, if total internal reflection is used to reflect light from the surface 36 so that it is on-axis with respect to the object 16, an air gap 42 or the like is maintained between the surface 36 and the second prism 30.

Instead of employing total internal reflection for the surface 38 to reflect light from the image source 18, the surface 38 up to the edge 44 of the object 16 or slide 19 may use a reflective coating. The display 12 can then be mounted on the remaining portion of the surface 38 with an index matching fluid or adhesive. Similarly, instead of using total internal reflection at the surface 36 to reflect light on-axis to the object 16, a partially reflective mirror or mirror coating may be used. As discussed below, the beam splitter surface 36 may also be formed as a polarizer reflector.

In another embodiment of the present invention, the optics include polarizers 24 and 25. The beam splitter surface 36 of the prism 26 is further formed as a polarizer reflector. A polarizer reflector may be formed of a glass or plastic sheet with a coating such as the 3M film DBEF. This polarizer reflector may be formed as a separate component with an air gap on one or both sides thereof or it may be laminated to either the surface 36 of the prism 26 or to a surface 46 of the prism 30 or to both surfaces 36 and 46. In this embodiment, light from the source 18 is directed to the polarizer 24 by the illumination lens 22. The polarizer 24 polarizes the light so that it is, for example, S polarized with respect to the beam splitting surface 36 of the prism 26. The polarized light enters the prism 26 and is reflected from the first prism surface 38 to the beam splitting surface 36. The beam splitting surface 36 reflects the S polarized light to the object 16 to be viewed so that it is on-axis, i.e., perpendicular to the surface of the object 16 and/or slide 19. A second polarizer 25 is formed by a quarter-wave plate or the like. A quarter-wave plate changes the linearly polarized light reflected from the beam splitter surface 36 to circular or nearly elliptical polarization as the light passes therethrough to the object 16. The light reflected from the object 16 passes back through the quarter-wave plate again, becoming linearly polarized but at 90° from the original polarization of the light reflected by the surface 36 to the object 16. Specifically, where the surface 36 reflects S polarized light to the object 16, the quarter-wave plate passes P polarized light back to the beam splitter surface 36. The polarized light passes through the beam splitter 36 to the prism 30, lens 32, lens 34 and to the eye 20.

It is noted, that an additional lens may be added between the lens 32 and the lens 34 so as to decrease the optical power of the lens 34 and increase the angle of the image rays as they pass from the object 16 through the lenses into the cornea forming an image on the retina of the user's eye. Since the field of view that the user perceives is determined by the ray angle of the image formed on the retina, the increase in the ray angle with the additional lens provides an increased field of view on the order of at least 28°. In order to provide color correction, either surface 67 or 68 of the lens 34 may be formed as a defractive surface. It is further noted that the field lens 32 may be formed as a separate optical element or as an integral part of the optic 30. The field lens 32 may be either a positive lens as shown or a negative lens. If formed as a negative lens, again the lens 32 may be formed as a separate element or it may be formed in the surface of the optic 30. When the lens 32 is formed as a negative lens, the negative lens causes the rays from the object 16 to diverge so as to increase the ray angle even further, resulting in an increased field of view on the order of 38°.

Figure 4:
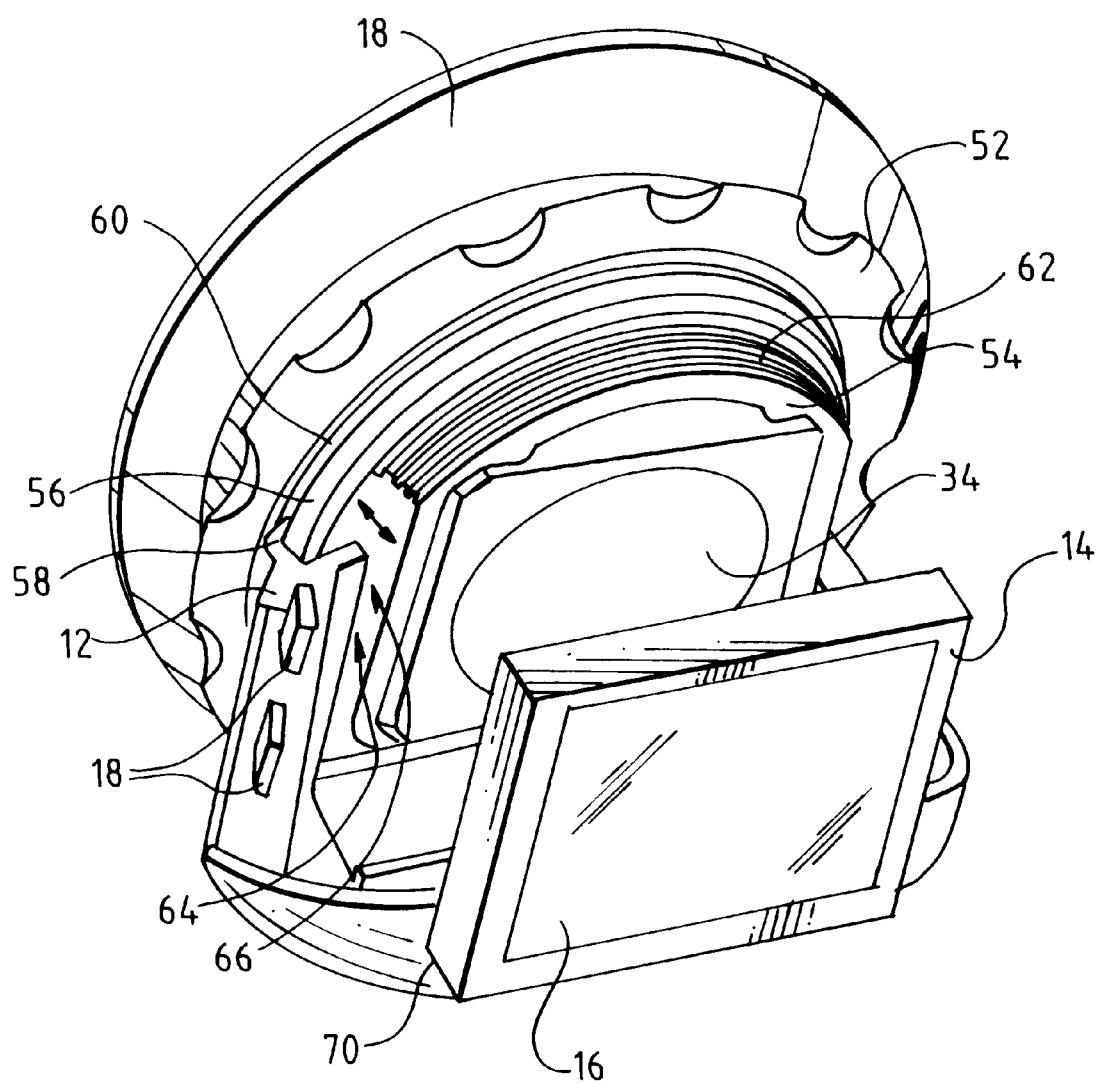
FIG. 4 is a perspective view of a partial cut-away of the housing illustrating the mounting of a movable focusing optic of the miniature microscope.

In order to change the focus of the miniature microscope, the focusing lens 34 is movably mounted relative to the object 16 and/or holder 14 as shown in detail in FIG. 4. As shown therein, the miniature microscope 10 includes a focus adjustment knob or ring 52 mounted on the housing 12. The focus adjustment knob 52 is manually rotatable by a user to move the focusing lens 34 axially with respect to the object 16 or an image plane to provide a focus adjustment. Because the lens 34 may be an aspheric lens or a square lens, the lens 34 is mounted in a lens support member 54 that cooperates with the housing 12 to prevent rotation of the lens 34. Similarly, while the ring 52 can rotate, the housing 12 prevents axial movement of the ring 52.

More particularly, the focus adjustment knob or ring 52 includes a flange 56 that is disposed in a detent or aperture 58 of the housing 12. The walls defining the aperture 58 prevent axial movement of the ring 52 by providing a stop for the flange 56. The aperture 58, however, allows the flange 56 to be rotated therein. An inner surface 60 of the ring 52 is threaded for engagement with a helical thread 62 on an outer surface of the lens support member 54. The helical thread 62 does not extend around the entire periphery of the lens support 54. Instead, the support member 54 has at least one flat side 64 that abuts a wall 66 of the housing 12 wherein the wall 66 forms a stop for the lens support member 54. The wall 66 and flat side of the lens support member 54 prevent the lens support member 54 and thus the lens 34 from rotating as the ring 52 rotates. As the ring 52 rotates, the threads of the ring engage the threads 62 of the lens support member 54 to move the lens support member 54 and thus the lens 34 axially with respect to the object 16 or an image plane.

The miniature microscope of the present invention is extremely compact and lightweight, the unit fitting in a palm of a user's hand so as to be readily portable. Although the microscope 10 is extremely small, the optical system of the present invention provides powerful magnification and enhanced brightness so that it is suitable for use in daylight.

It is noted, that the miniature microscope 10 of the present invention can be used without the object holder 14. In this embodiment, an aperture 70 is formed in the housing 12 in the position of the object holder 14 so that an object can be viewed through the aperture 70. In this embodiment, the focusing lens 34 may be movable or it may be fixed. If the focusing lens is mounted in a fixed position in the housing 12, the user manually positions the microscope 10 with respect to the object to be viewed through the aperture 70.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A miniature microscope comprising:
    a housing having a holder for supporting an object to be viewed;
    at least one light source positioned in the housing off-axis with respect to the object to be viewed when supported within the holder;
    a first prism having a first prism surface for reflecting light from the light source to a beam splitter surface, the beam splitter surface reflecting light from the first prism surface to the object to be viewed and the beam splitter passing therethrough light reflected from the object;
    a second prism positioned with respect to said first prism to provide refraction correction;
    a movable focusing optic receiving light passed through said first and second prisms for providing a magnified image of the object supported in the holder.

2. A miniature microscope as recited in claim 1 wherein said first prism uses total internal reflection for reflecting light from the first surface to the beam splitter surface.

3. A miniature microscope as recited in claim 1 wherein said beam splitter surface is a surface of the prism and uses total internal reflection for reflecting light from the first prism surface to the object to be viewed.

4. A miniature microscope as recited in claim 1 having a first polarizer disposed between the light source and first prism surface for providing light of a first polarization, a second polarizer disposed between the first prism and the object to be viewed for changing the polarization of light reflected from the object to a second polarization and wherein the beam splitter surface is formed as a polarizer reflector that reflects light of the first polarization to the object and that passes light of the second polarization therethrough.

5. A miniature microscope as recited in claim 4 wherein said second polarizer is a quarter-wave plate.

6. A miniature microscope as recited in claim 1 wherein said focusing optic is mounted in said housing for axial movement without rotation.

7. A miniature microscope as recited in claim 1 including a ring mounted on the housing for rotation without axial movement and a support for the focusing optic mounted in the housing to prevent rotation thereof, the support being moved axially by the ring as the ring is rotated.

8. A miniature microscope as recited in claim 7 wherein said support for the focusing optic has a flat surface abutting a stop in the housing to prevent rotation thereof.

9. A miniature microscope as recited in claim 7 wherein said ring includes a threaded inner surface engagable by a threaded outer surface of the optic support to move the optic support axially as the ring is rotated.

10. A miniature microscope as recited in claim 7 wherein said ring includes an annular flange retained in a detent in the housing to prevent axial movement of the ring as the ring is rotated.

11. A miniature device for magnifying an object on a slide comprising:
    a slide holder for supporting a slide having an object to be magnified;
    at least one light source positioned off-axis with respect to a slide when supported in the slide holder;
    a first prism having a first prism surface for reflecting light from the light source to a beam splitter surface, the beam splitter surface reflecting light from the first prism surface to the slide and the beam splitter passing therethrough light reflected from the slide;
    a focusing optic receiving light passed through the beam splitter from the slide for providing a magnified image of the material on the slide; and
    a mounting for the focusing optic to allow the focusing optic to be moved axially with respect to the slide.

12. A miniature device for magnifying an object on a slide as recited in claim 11 including a second prism positioned adjacent the first prism to provide refraction correction.

13. A miniature device for magnifying an object on a slide as recited in claim 11 wherein said prism uses total internal reflection for reflecting light from the first surface to the beam splitter surface.

14. A miniature device for magnifying an object on a slide as recited in claim 11 wherein said beam splitter surface is a surface of the prism and uses total internal reflection for reflecting light from the first prism surface to the slide.

15. A miniature device for magnifying an object on a slide as recited in claim 11 including a housing and wherein said mounting for the focusing optic includes a ring mounted on the housing for rotation without axial movement and a support for the focusing optic mounted in the housing to prevent rotation thereof, said support being moved axially by the ring as the ring is rotated.

16. A miniature device for magnifying an object on a slide as recited in claim 15 wherein said optic support has a flat surface abutting a stop in the housing to prevent rotation thereof.

17. A miniature device for magnifying an object on a slide as recited in claim 15 wherein said ring includes a threaded inner surface engagable by a threaded outer surface of the optic support to move the optic support axially as the ring is rotated.

18. A miniature device for magnifying an object on a slide as recited in claim 17 wherein said ring includes an annular flange retained in a detent in the housing to prevent axial movement of the ring as the ring is rotated.

19. A miniature device for magnifying an object on a slide as recited in claim 11 having a first polarizer disposed between the light source and first prism surface for providing light of a first polarization, a second polarizer disposed between the first prism and the object to be viewed for changing the polarization of light reflected from the object to a second polarization and wherein the beam splitter surface is formed as a polarizer reflector that reflects light of the first polarization to the object and that passes light of the second polarization therethrough.

20. A miniature device for magnifying an object so that aspects of the object that cannot be resolved by an unaided eye can be seen, comprising:

a housing with an aperture therein through which an object to be magnified is viewed;

at least one light source positioned in the housing off-axis with respect to the aperture to illuminate an object viewed through the aperture;

a first prism having a first surface for reflecting light from the light source to a beam splitter surface, the beam splitter surface reflecting light from the first prism surface to the aperture to illuminate the object viewed therethrough and the beam splitter passing therethrough light reflected from the object through the aperture; and a focusing lens receiving light passed through the beam splitter from the object for providing a magnified image of the object.

* * * * *